(12) United States Patent
Chodacki et al.

(10) Patent No.: US 9,285,120 B2
(45) Date of Patent: Mar. 15, 2016

(54) IGNITER SHIELD DEVICE AND METHODS ASSOCIATED THEREWITH

(71) Applicant: COORSTEK, INC., Golden, CO (US)

(72) Inventors: Thomas Anthony Chodacki, Bennington, NH (US); Brian Michael Lusignan, Milford, NH (US); Michael Wilfred Tanguay, Temple, NH (US); Vincent Lanzone, Brookline, NH (US)

(73) Assignee: COORSTEK, INC., Golden, CO (US)

( * ) Notice: Subject to any disclaimer, the term of this patent is extended or adjusted under 35 U.S.C. 154(b) by 375 days.

(21) Appl. No.: 13/786,162

(22) Filed: Mar. 5, 2013

(65) Prior Publication Data
US 2014/0099585 A1    Apr. 10, 2014

Related U.S. Application Data

(60) Provisional application No. 61/710,699, filed on Oct. 6, 2012.

(51) Int. Cl.
*F23Q 7/00*    (2006.01)
*F23Q 3/00*    (2006.01)
(Continued)

(52) U.S. Cl.
CPC .............. *F23Q 3/006* (2013.01); *B23P 11/00* (2013.01); *F23Q 7/22* (2013.01); *Y10T 29/49826* (2015.01)

(58) Field of Classification Search
CPC ............. F23Q 7/00; F23Q 7/001; F23Q 7/10; F23Q 7/22; F23Q 9/00; F23Q 11/04; F23D 2207/00; F24C 3/103; F02C 7/266; H01T 13/32; H01T 13/54; H01T 13/467
USPC .................. 126/25 B; 431/263; 313/139, 143
See application file for complete search history.

(56) References Cited

U.S. PATENT DOCUMENTS 1,082,401 A * 12/1913 Cade .............................. 313/122
1,253,584 A *  1/1918 Gerken ......................... 313/140
(Continued)

FOREIGN PATENT DOCUMENTS

DE    10-2006-040247    3/2008
EP            0372553    6/1990
(Continued)

OTHER PUBLICATIONS

International Search Report and Written Opinion issued Jun. 2, 2014, in Application No. PCT/US2013/063391.
(Continued)

*Primary Examiner* — Jorge Pereiro
(74) *Attorney, Agent, or Firm* — Fox Rothschild LLP

(57) ABSTRACT

An igniter shield for use in combination with an igniter includes a substantially cylindrical-shaped body that includes a proximal portion, a distal portion, a first longitudinally oriented support and a second longitudinally oriented support wherein the first and second longitudinally oriented supports extend between and are connected to the proximal portion and the distal portion, the substantially cylindrical-shaped body further including a longitudinally oriented baffle circumferentially spaced apart from the first and second longitudinally oriented supports, wherein the baffle extends between and is connected to the proximal portion and the distal portion, and wherein the baffle includes a radially outward facing convex surface and a radially inward facing concave surface, the radially inward facing concave surface having a radius of curvature smaller than a radius of curvature of at least one of the proximal or distal portions.

19 Claims, 3 Drawing Sheets

(51) Int. Cl.
*B23P 11/00* (2006.01)
*F23Q 7/22* (2006.01)

(56) References Cited

U.S. PATENT DOCUMENTS

| | | | | |
|---|---|---|---|---|
| 2,609,808 | A | * | 9/1952 | Bychinsky .................... 313/120 |
| 2,760,340 | A | * | 8/1956 | Seglem ...................... 60/39.826 |
| 2,850,084 | A | * | 9/1958 | Kunzler ......................... 431/263 |
| 3,562,590 | A | * | 2/1971 | Mitts et al. .................... 219/267 |
| 3,602,206 | A | | 8/1971 | Kern et al. |
| 3,680,636 | A | | 8/1972 | Berry et al. |
| 3,787,169 | A | | 1/1974 | Gjerde |
| 3,823,345 | A | | 7/1974 | Mitts et al. |
| 3,958,144 | A | * | 5/1976 | Franks .......................... 313/138 |
| 4,029,936 | A | | 6/1977 | Schweitzer |
| 4,608,983 | A | * | 9/1986 | Muller ................. A61B 17/225 601/4 |
| 4,892,475 | A | | 1/1990 | Farrenkopf et al. |
| 4,946,384 | A | | 8/1990 | London |
| 4,983,877 | A | * | 1/1991 | Kashiwara ........... H01R 13/467 313/140 |
| 5,007,389 | A | | 4/1991 | Kashiwara et al. ... 123/169 MG |
| 5,014,656 | A | * | 5/1991 | Leptich et al. .......... 123/169 EL |
| 5,280,214 | A | * | 1/1994 | Johnson ........................ 313/139 |
| 5,328,355 | A | | 7/1994 | Kobayashi et al. |
| 5,408,961 | A | * | 4/1995 | Smith ....................... 123/169 R |
| 5,420,473 | A | * | 5/1995 | Thomas ................. G10K 15/06 313/141 |
| 5,430,346 | A | * | 7/1995 | Johnson ........................ 313/139 |
| 5,494,642 | A | * | 2/1996 | Sanada ......................... 422/174 |
| 5,496,170 | A | | 3/1996 | Primdahl et al. |
| 5,558,515 | A | | 9/1996 | Althaus et al. |
| 5,588,379 | A | | 12/1996 | Witteveen |
| 5,623,179 | A | * | 4/1997 | Buhl .............................. 313/141 |
| 5,791,892 | A | | 8/1998 | Dobbeling et al. |
| 5,828,161 | A | * | 10/1998 | Palyu ............................ 313/141 |
| 5,860,804 | A | | 1/1999 | Nachaj |
| 5,892,319 | A | * | 4/1999 | Rossi ............................ 313/141 |
| 6,060,822 | A | * | 5/2000 | Krupa ..................... H01T 13/20 313/138 |
| 6,080,029 | A | * | 6/2000 | Johnson et al. ................... 445/7 |
| 6,152,095 | A | * | 11/2000 | Ripma .................... H01T 13/08 123/142.5 E |
| 6,186,669 | B1 | * | 2/2001 | Honda ................. F16C 33/541 384/580 |
| 6,186,775 | B1 | | 2/2001 | Jansohn et al. |
| 6,363,898 | B1 | * | 4/2002 | Ripma .................... H01T 13/08 123/142.5 E |
| 6,608,430 | B1 | * | 8/2003 | Schaus .......................... 313/140 |
| 6,670,740 | B2 | * | 12/2003 | Landon, Jr. .................... 313/141 |
| 6,748,735 | B2 | | 6/2004 | Schmotolocha et al. |
| 6,777,650 | B1 | | 8/2004 | Hamel |
| 7,786,409 | B2 | | 8/2010 | Hamel et al. |
| 8,125,130 | B2 | * | 2/2012 | Martin et al. .................. 313/141 |
| 2002/0030427 | A1 | * | 3/2002 | Landon, Jr. ........... H01T 13/467 313/141 |
| 2003/0085643 | A1 | * | 5/2003 | Matsubara .............. H01T 13/14 313/141 |
| 2004/0041505 | A1 | * | 3/2004 | Fischer .................... H01T 13/32 313/141 |
| 2005/0062386 | A1 | * | 3/2005 | Francesconi et al. ......... 313/143 |
| 2006/0219691 | A1 | * | 10/2006 | Hamel et al. .................. 219/267 |
| 2006/0228660 | A1 | | 10/2006 | Schmiedlin et al. |
| 2007/0252503 | A1 | * | 11/2007 | Rossi ............................ 313/141 |
| 2008/0000441 | A1 | * | 1/2008 | Jun .......................... F02B 19/14 123/169 EL |
| 2008/0141651 | A1 | * | 6/2008 | Eason et al. ................ 60/39.821 |
| 2008/0248435 | A1 | | 10/2008 | Clark et al. |
| 2009/0105806 | A1 | * | 4/2009 | Benjamin ................. A61F 2/92 623/1.15 |
| 2009/0277410 | A1 | * | 11/2009 | Kameda .................... 123/169 R |
| 2011/0264269 | A1 | | 10/2011 | Chodacki |
| 2012/0282560 | A1 | * | 11/2012 | Cadima ......................... 431/258 |
| 2013/0081611 | A1 | * | 4/2013 | Cadima .................... F24C 3/103 126/39 E |
| 2013/0224671 | A1 | * | 8/2013 | Carey et al. .................... 431/253 |
| 2013/0313960 | A1 | * | 11/2013 | Francesconi ................... 313/140 |

FOREIGN PATENT DOCUMENTS

| | | |
|---|---|---|
| JP | 553-122267 | 9/1978 |
| JP | 553-122271 | 9/1978 |
| JP | H11-337065 | 12/1999 |
| JP | 2008530487 | 8/2008 |
| WO | 01/57445 | 8/2001 |
| WO | 2006/086225 | 8/2006 |
| WO | 2008/127467 | 10/2008 |
| WO | WO 2008127467 A2 * | 10/2008 ............. F02C 7/266 |

OTHER PUBLICATIONS

Office Action dated Dec. 21, 2015 in Chinese Patent Application No. 201380058570.X (English translation also attached).

* cited by examiner

IGNITER SHIELD DEVICE AND METHODS ASSOCIATED THEREWITH

CROSS-REFERENCE TO RELATED APPLICATION

The present application claims the benefit of U.S. Provisional Patent Application No. 61/710,699 filed on Oct. 6, 2012, which is incorporated herein by reference in its entirety.

FIELD

The present invention is related to a shield for positioning proximate an igniter.

SUMMARY

It is to be understood that the present invention includes a variety of different versions or embodiments, and this Summary is not meant to be limiting or all-inclusive. This Summary provides some general descriptions of some of the embodiments, but may also include some more specific descriptions of other embodiments.

An igniter shield is provided that is used with an igniter, such as an igniter beat in a furnace, oven or water heater. Accordingly, in at least one embodiment, an igniter shield for use in combination with an igniter is provided, the igniter shield comprising:
 a substantially cylindrical-shaped body that includes:
 a proximal portion;
 a distal portion;
 a first longitudinally oriented support and a second longitudinally oriented support, wherein the first and second longitudinally oriented supports extend between and are connected to the proximal portion and the distal portion;
 a longitudinally oriented baffle circumferentially spaced apart from the first and second longitudinally oriented supports, wherein the baffle extends between and is connected to the proximal portion and the distal portion, and wherein the baffle includes a radially outward facing convex surface and a radially inward facing concave surface, the radially inward facing concave surface having a radius of curvature that is smaller than a radius of curvature of the proximal portion.

In addition to the foregoing, in at least one embodiment, the radius of curvature of the longitudinally oriented baffle is between about 0.3 to 0.7 of the radius of curvature of the proximal portion. In at least one embodiment, the radius of curvature of the longitudinally oriented baffle is between about 0.45 to 0.55 of the radius of curvature of the proximal portion. In at least one embodiment, the radius of curvature of the longitudinally oriented baffle is about 50% of the radius of curvature of the proximal portion. In at least one embodiment, the baffle does not include any perforations. In at least one embodiment, each of the first and second longitudinally oriented supports includes a longitudinally extending rib. In at least one embodiment, the longitudinally extending ribs include a radially outward facing concave surface. In at least one embodiment, the radially outward facing concave surface of the longitudinally extending ribs has a smaller radius of curvature than the longitudinally oriented baffle. In at least one embodiment, the longitudinally extending ribs include a radially inward facing convex surface. In at least one embodiment, the first and second longitudinally oriented supports are circumferentially spaced apart at about 120 degrees from each other. In at least one embodiment, the longitudinally oriented baffle is circumferentially spaced apart at about 120 degrees from each of the first and second longitudinally oriented supports. In at least one embodiment, the substantially cylindrical shaped body is not circumferentially closed. In at least one embodiment, the substantially cylindrical shaped body comprises an open seam situated diametrically opposite a centerline of the longitudinally oriented baffle. In at least one embodiment, the igniter shield further comprises a mounting base connected to the proximal portion of the substantially cylindrical shaped body. In at least one embodiment, openings between the first and second longitudinally oriented supports and between the first and second longitudinally oriented supports and the longitudinally oriented baffle occupy a greater circumferential area than a circumferential area of the first and second longitudinally oriented supports and the longitudinally oriented baffle.

A method of positioning an igniter shield in an apparatus having an igniter is also provided, the method comprising:
 forming an igniter shield using a "blank" suitable for manipulation into the igniter shield;
 causing one or more portions of the blank to become shaped as the igniter shield for enclosing the igniter;
 inserting the igniter within the igniter shield; and
 mounting the igniter and igniter shield within the apparatus;
 wherein the igniter shield includes a baffle, and wherein the baffle has a radius of curvature that is smaller than a radius of curvature of the proximal or distal portions of the igniter shield.

Various components are referred to herein as "operably associated." As used herein, "operably associated" refers to components that are linked together in operable fashion, and encompasses embodiments in which components are linked directly, as well as embodiments in which additional components are placed between the two linked components.

As used herein, "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

Various embodiments of the present inventions are set forth in the attached figures and in the Detailed Description as provided herein and as embodied by the claims. It should be understood, however, that this Summary does not contain all of the aspects and embodiments of the one or more present inventions, is not meant to be limiting or restrictive in any manner, and that the invention(s) as disclosed herein is/are understood by those of ordinary skill in the art to encompass obvious improvements and modifications thereto.

Additional advantages of the present invention will become readily apparent from the following discussion, particularly when taken together with the accompanying drawings.

BRIEF DESCRIPTION OF THE DRAWINGS

To further clarify the above and other advantages and features of the one or more present inventions, a more particular description of the one or more present inventions is rendered by reference to specific embodiments thereof which are illustrated in the appended drawings. It should be appreciated that these drawings depict only typical embodiments of the one or more present inventions and are therefore not to be considered limiting of its scope. The one or more present inventions are described and explained with additional specificity and detail through the use of the accompanying drawings in which.

Figure 1:
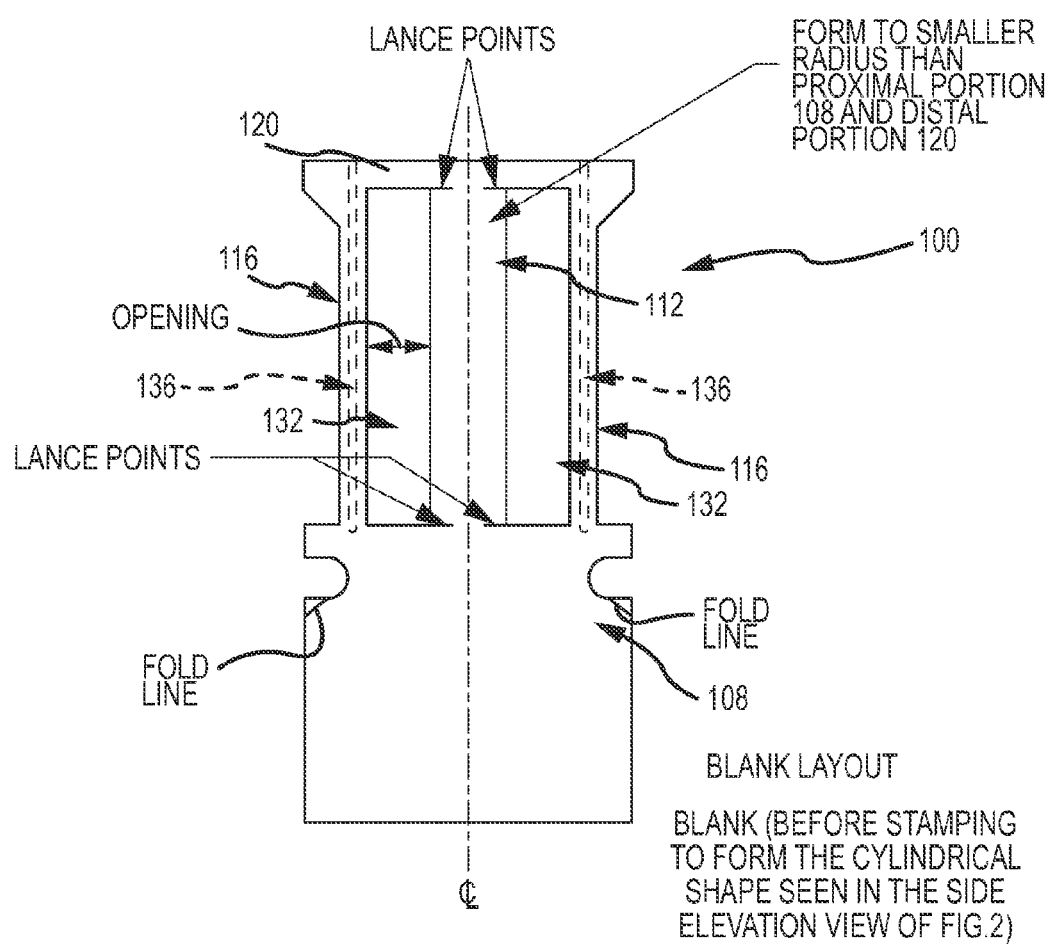
FIG. 1 is a side elevation view of an embodiment of the one or more present inventions, wherein the device is shown as a blank prior to forming it into an igniter shield.

All dimensions shown on the drawings and/or referred to herein are for purposes of enablement and/or written description, and are provided by way of example and are not to be interpreted as limiting one or more embodiments of the one or more present inventions unless expressly claimed.

The drawings are not necessarily to scale.

DETAILED DESCRIPTION

One or more embodiments of the one or more inventions described herein are directed to an igniter shield for use in combination with an igniter, wherein the igniter could be associated with a variety of different types of devices, such as a furnace or oven.

Accordingly, and with reference now to FIGS. 1-4 accompanying this written description, in at least one embodiment the igniter shield 100 includes a mounting base 104, proximal portion 108, a baffle 112, longitudinal supports 116, and a distal portion 120. The baffle 112 and longitudinal supports 116 extend longitudinally between the proximal portion 108 and the distal portion 120. The baffle 112 includes a convex surface 124 facing toward a gas source G, and a concave surface 128 facing toward the igniter I (such as a hot surface igniter) when the igniter shield 100 and the igniter I are assembled. In at least one embodiment, the concave portion 128 forms a semi-circle in a transversely oriented cross-section of the baffle 112. The igniter I is also situated radially interior to the baffle 112 and the supports 116. Preferably, the baffle 112 is solid (that is, it does not include any perforations).

Figure 3:
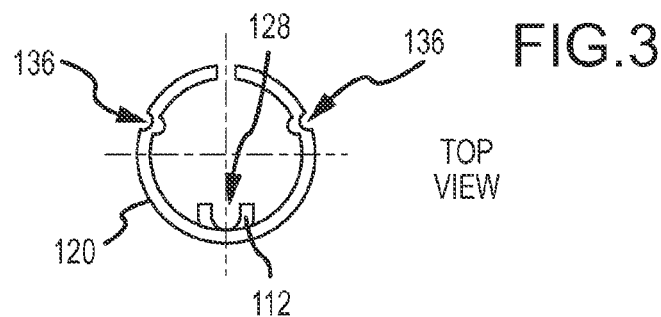
FIG. 3 is a top elevation view of the device shown in FIG. 2.
Figure 2:
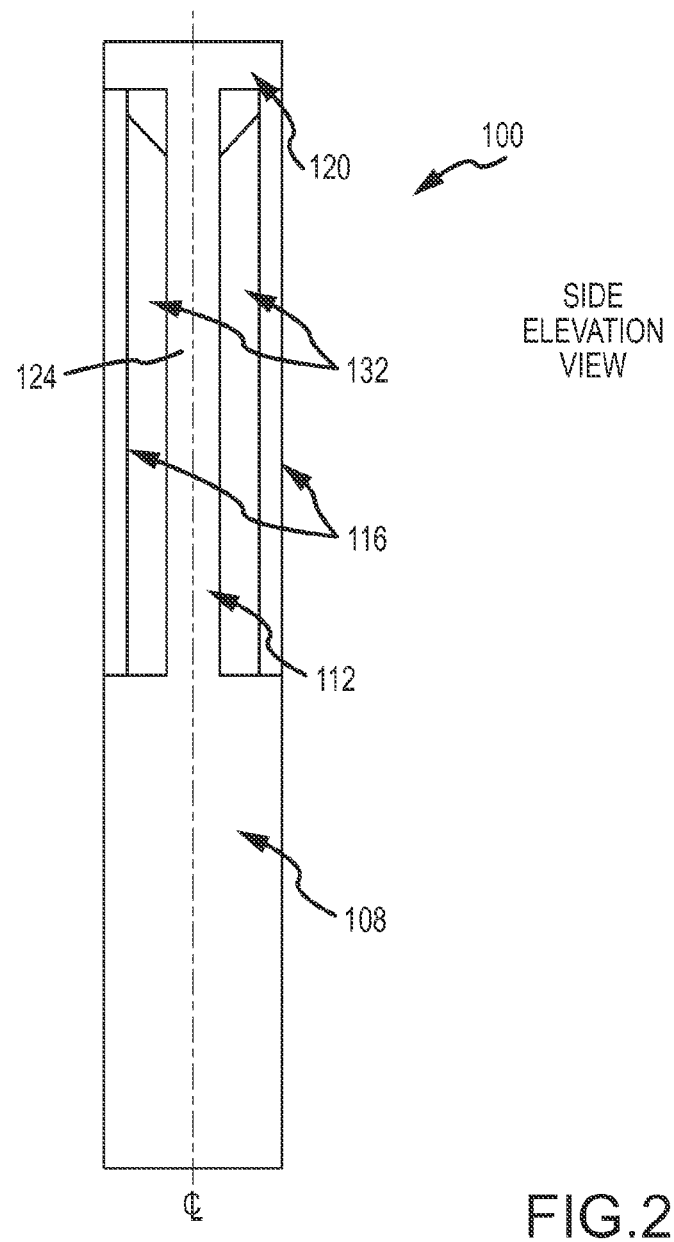
FIG. 2 is a side elevation of the device of FIG. 1 after forming it into an igniter shield.
Figure 4:
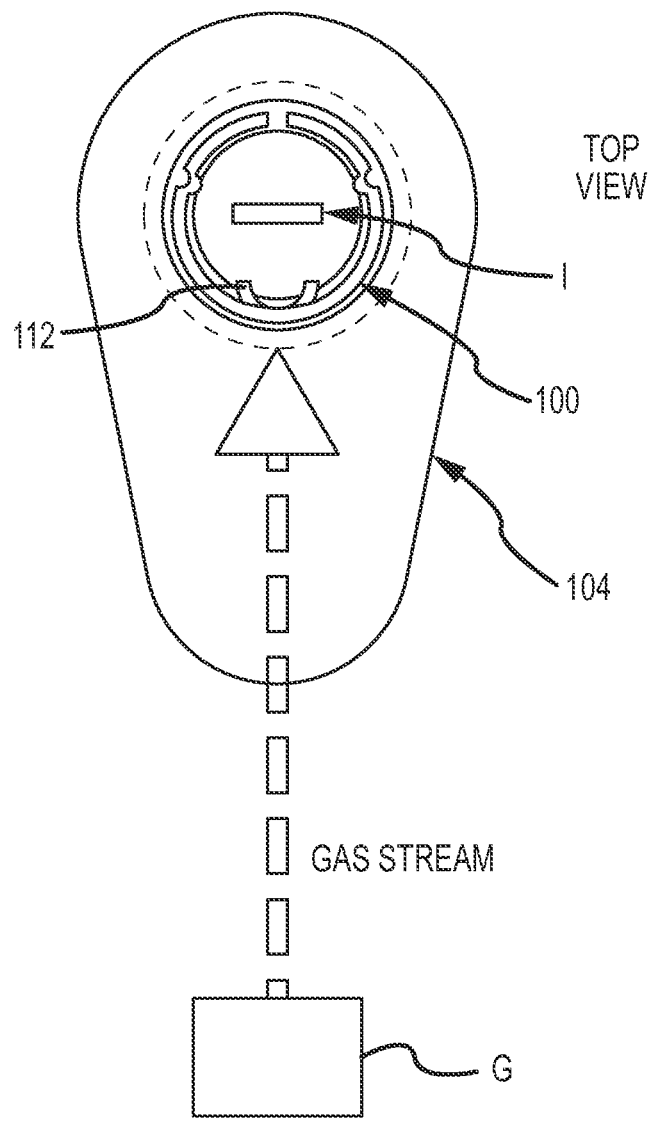
FIG. 4 is a top elevation of the device shown in FIG. 3, further including a mounting base and an igniter enclosed within the igniter shield.

As best seen in FIG. 3, the baffle 112 has a smaller radius of curvature than the overall igniter shield 100, such as the radius of curvature of the proximal portion 108 and/or the distal portion 120. More particularly, and by way of example and not limitation, the baffle 112 may have a radius of curvature that is between about 0.30 to 0.70 of the radius of curvature of the overall igniter shield 100, and more preferably between about 0.35 to 0.65 of the radius of curvature of the overall igniter shield 100, and more preferably yet, between about 0.40 and 0.60 of the radius of curvature of the overall igniter shield 100, and still more preferably yet, between about 0.45 and 0.55 of the radius of curvature of the overall igniter shield 100. For the example igniter shield shown in FIGS. 1-4, the radius of curvature of the proximal portion 108 is 0.192 inches (for an igniter shield having an inside diameter of 0.383 inches), and the baffle 112 has a radius of curvature of 0.093 inches, thus yielding a ratio of about 0.484 (that is, the baffle 112 shown in FIGS. 1-4 has a radius of curvature that is about 0.484 of the radius of curvature of the overall igniter shield). Thus, in at least one embodiment, the radius of curvature of the baffle is approximately 50% of the radius of curvature of the overall igniter shield. The foregoing dimensions are to be understood as exemplary (that is, examples only), and are not to be interpreted as limiting unless expressly claimed.

When in use, a gas stream from the gas source G is directed toward the igniter I, however, the gas stream encounters the convex surface 124 of the baffle 112, thereby causing the gas stream to flow around the baffle 112 and improving the gas stream's ignition characteristics. That is, the baffle 112 slows and causes turbulence of the gas stream allowing it to mix with air, thereby improving the ignition characteristics of the fuel/air mixture. In addition, the open spaces 132 between the baffle 112 and supports 116 result in less shield mass surrounding the igniter I, thus providing an igniter shield 100 that does not get excessively hot for its intended purpose.

Referring still to FIGS. 1-4, in at least one embodiment the longitudinal supports 116 include a longitudinally extending rib 136. More particularly, each longitudinal support 116 includes a rib having an outward facing concave rib. The outward facing concave rib within each longitudinal support serves to stiffen the longitudinal support, thereby improving the structural integrity provided by the longitudinal supports 116, and thus adding further protection of the igniter provided by the igniter shield 100. Moreover, as best seen in FIG. 3, baffle 112 and longitudinal supports 116 are arranged circumferentially at approximately 120 degrees of each other within the substantially circular footprint of the igniter shield 100. This triangular arrangement of the baffle 112 and longitudinal supports 116, in combination with the proximal portion 108 and distal portion 120, serve to provide a stable configuration for the longevity of providing a protective shield for the igniter I and a stable baffle 112 for intercepting and deflecting the gas stream in the vicinity of the igniter I.

In at least one embodiment, the igniter shield includes a mounting base, proximal portion, a baffle, longitudinal supports, and a distal portion, wherein at least one of the proximal portion, baffle, and distal portion include one or more straight segments of material, and include portions having a polygonal transversely oriented cross-sectional shape.

One or more embodiments described herein have application to a variety of devices, including: residential gas furnaces; residential gas boilers; commercial gas boilers; residential gas water heaters; commercial gas water heaters; commercial gas furnaces; gas incinerators; residential cooking appliances; commercial cooking equipment; instantaneous water heaters; and, radiant heating units. The normal gases used in the applications include: natural gas (90-95% methane); and propane and liquefied petroleum gas (90-95% propane with the balance mainly butane). The burner sizes can range from 10,000 btu's (mini burners in residential furnaces) to over 1,000,000 btu's (radiant and blue flame metal mesh fabric burners in commercial heating units). The normal atmospheric residential gas burners in both heating and cooking appliances only get about 50% of the required combustion air (called "primary") through the burner orifice and venture. The other 50% of the air (called "secondary") is drawn into the gas stream at the burner face. Slowing down and causing turbulence in the gas stream can aid in the aeration of the gas for proper combustion. The foregoing usage applications and typical operating parameters are to be understood as exemplary (that is, examples only), and are not to be interpreted as limiting unless expressly claimed.

In at least one embodiment, the baffle 112 directs gas flow in a substantially circular motion toward the igniter I, thereby creating turbulence in the gas stream which reduces the flow rate of the gas stream. The baffle 112 also helps introduce secondary combustion air into the gas stream and promotes better combustion characteristics of principal gases. At the same time, the baffle 112 also decreases the impact of cooling that the gas stream has on the energized igniter I, and therefore, less voltage is needed to cause the gas stream to ignite. Accordingly, the size, shape and position of the baffle 112 contribute to the gas stream flow characteristics, and the addition of the longitudinal supports 116 reinforces that portion of the igniter shield 100 that is located distally of the proximal portion 108 of the igniter shield 100, thereby effectively reducing the material mass and the radiating surface area of the igniter shield 100, but also maintaining necessary shield strength to stiffen the igniter shield 100 and protect the igniter I. Thus, embodiments of the one or more present inventions have a limited amount of shield material that directly surrounds the igniter, and therefore it has a limited radiant surface. This limited radiant surface around the igniter decreases temperature adders over a range of operating voltages. This improves the longevity of the igniter.

A method of positioning an igniter shield in an apparatus having a burner is also provided. The method includes forming an igniter shield using a "blank" suitable for manipulation into the igniter shield, causing one or more portions of the blank to become shaped as an igniter shield for enclosing an igniter, inserting an igniter within the igniter shield, and mounting the igniter and igniter shield within the apparatus, wherein the igniter shield includes a baffle, and wherein the baffle has a smaller radius of curvature than a proximal or distal portion of the igniter shield.

The igniter shield may be made of a suitable material for its intended purpose, such as 601 inconel or a substantially equivalent material.

The one or more present inventions may be embodied in other specific forms without departing from its spirit or essential characteristics. The described embodiments are to be considered in all respects only as illustrative and not restrictive. The scope of the one or more present inventions is, therefore, indicated by the appended claims rather than by the foregoing description. All changes which come within the meaning and range of equivalency of the claims are to be embraced within their scope.

The one or more present inventions, in various embodiments, includes components, methods, processes, systems and apparatus substantially as depicted and described herein, including various embodiments, subcombinations, and subsets thereof. Those of skill in the art will understand how to make and use the one or more present inventions after understanding the present disclosure.

The one or more present inventions, in various embodiments, includes providing devices and processes in the absence of items not depicted and/or described herein or in various embodiments hereof, including in the absence of such items as may have been used in previous devices or processes (e.g., for improving performance, achieving ease and/or reducing cost of implementation).

The foregoing discussion of the one or more present inventions has been presented for purposes of illustration and description. The foregoing is not intended to limit the one or more present inventions to the form or forms disclosed herein. In the foregoing Detailed Description for example, various features of the one or more present inventions are grouped together in one or more embodiments for the purpose of streamlining the disclosure. This method of disclosure is not to be interpreted as reflecting an intention that the claimed one or more present inventions requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the one or more present inventions.

Moreover, though the description of the one or more present inventions has included description of one or more embodiments and certain variations and modifications, other variations and modifications are within the scope of the one or more present inventions (e.g., as may be within the skill and knowledge of those in the art, after understanding the present disclosure). It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An igniter shield for use in combination with a hot surface igniter, the igniter shield comprising:
    a substantially cylindrical-shaped body that includes:
        a proximal portion;
        a distal portion;
        a first longitudinally oriented support and a second longitudinally oriented support, wherein the first and second longitudinally oriented supports extend between and are connected to the proximal portion and the distal portion;
        a longitudinally oriented baffle circumferentially spaced apart from the first and second longitudinally oriented supports, wherein the longitudinally oriented baffle is circumferentially wider than both the first and second longitudinally oriented supports, wherein the longitudinally oriented baffle extends between and is connected to the proximal portion and the distal portion, and wherein the longitudinally oriented baffle includes a radially outward facing convex surface and a radially inward facing concave surface, the radially inward facing concave surface having a radius of curvature that is smaller than a radius of curvature of the proximal portion;
    wherein openings between the first and second longitudinally oriented supports and between the first and second longitudinally oriented supports and the longitudinally oriented baffle occupy a greater circumferential area than a circumferential area of the first and second longitudinally oriented supports and the longitudinally oriented baffle.

2. The igniter shield of claim 1, wherein at least a portion of an exterior surface of the longitudinally oriented baffle is longitudinally aligned with and coplanar to at least a portion of the proximal portion of the substantially cylindrical-shaped body and the portion of the exterior surface of the longitudinally oriented baffle is also longitudinally aligned with and coplanar to at least a portion of the distal portion of the substantially cylindrical-shaped body.

3. The igniter shield of claim 1, wherein the longitudinally oriented baffle and the first and second longitudinally oriented supports each have respective longitudinal axes that are parallel to a longitudinal axis of the substantially cylindrical-shaped body.

4. An igniter shield for use in combination with a hot surface igniter, the igniter shield comprising:
    a substantially cylindrical-shaped body that includes:
        a proximal portion;
        a distal portion;
        a first longitudinally oriented support and a second longitudinally oriented support, wherein the first and second longitudinally oriented supports extend between and are connected to the proximal portion and the distal portion;

a longitudinally oriented baffle circumferentially spaced apart from the first and second longitudinally oriented supports, wherein the longitudinally oriented baffle extends between and is connected to the proximal portion and the distal portion, wherein the longitudinally oriented baffle includes a radially outward facing convex surface and a radially inward facing concave surface, the radially inward facing concave surface having a radius of curvature that is smaller than a radius of curvature of the proximal portion, wherein each of the first and second longitudinally oriented supports includes a longitudinally extending rib, wherein the longitudinally extending ribs include a radially outward facing concave surface, and wherein the radially outward facing concave surface of the longitudinally extending ribs has a smaller radius of curvature than the longitudinally oriented baffle.

5. The igniter shield of claim 4, wherein the radius of curvature of the longitudinally oriented baffle is between about 0.30 to 0.70 of the radius of curvature of the proximal portion.

6. The igniter shield of claim 4, wherein the radius of curvature of the longitudinally oriented baffle is between about 0.45 to 0.55 of the radius of curvature of the proximal portion.

7. The igniter shield of claim 4, wherein the radius of curvature of the longitudinally oriented baffle is about 50% of the radius of curvature of the proximal portion.

8. The igniter shield of claim 4, wherein the longitudinally oriented baffle does not include any perforations.

9. The igniter shield of claim 4, wherein the longitudinally extending ribs include a radially inward facing convex surface.

10. The igniter shield of claim 4, wherein the first and second longitudinally oriented supports are circumferentially spaced apart at about 120 degrees from each other around the circumferential perimeter of the substantially cylindrical-shaped body.

11. The igniter shield of claim 10, wherein the longitudinally oriented baffle is circumferentially spaced apart at about 120 degrees from each of the first and second longitudinally oriented supports.

12. The igniter shield of claim 4, wherein the substantially cylindrical shaped body is not circumferentially closed.

13. The igniter shield of claim 4, wherein the substantially cylindrical shaped body comprises an open seam situated diametrically opposite a centerline of the longitudinally oriented baffle.

14. The igniter shield of claim 4, further comprising a mounting base connected to the proximal portion of the substantially cylindrical shaped body.

15. The igniter shield of claim 4, wherein openings between the first and second longitudinally oriented supports and between the first and second longitudinally oriented supports and the longitudinally oriented baffle occupy a greater circumferential area than a circumferential area of the first and second longitudinally oriented supports and the longitudinally oriented baffle.

16. A method of positioning the igniter shield in an apparatus having the hot surface igniter, the method comprising:
   forming the igniter shield according to claim 4 using a blank suitable for manipulation into the igniter shield;
   causing one or more portions of the blank to become shaped as the igniter shield for enclosing the hot surface igniter;
   inserting the hot surface igniter within the igniter shield; and
   mounting the hot surface igniter and igniter shield within the apparatus.

17. The method of claim 16, wherein the radius of curvature of the longitudinally oriented baffle is between about 0.30 to 0.70 of the radius of curvature of the proximal portion.

18. The method of claim 16, wherein the radius of curvature of the longitudinally oriented baffle is between about 0.45 to 0.55 of the radius of curvature of the proximal portion.

19. The method of claim 16, wherein the radius of curvature of the longitudinally oriented baffle is about 50% of the radius of curvature of the proximal portion.

* * * * *